United States Patent [19]
Frisque

[11] 3,867,330
[45] Feb. 18, 1975

[54] BRINES CONTAINING WATER-SOLUBLE ANIONIC VINYL ADDITION POLYMER AND WATER SOLUBLE CATIONIC POLYMER

[75] Inventor: Alvin J. Frisque, La Grange, Ill.

[73] Assignee: Nalco Chemical Company, Chicago, Ill.

[22] Filed: July 30, 1973

[21] Appl. No.: 383,865

[52] U.S. Cl.............. 260/29.6 NR, 260/29.4 UA, 260/29.6 WB
[51] Int. Cl. .......................................... C08f 45/24
[58] Field of Search ............ 260/29.6 NR, 29.6 RW, 260/29.40 UA, 29.6 WB, 29.6 WA

[56] References Cited
UNITED STATES PATENTS
| | | | |
|---|---|---|---|
| 3,637,564 | 1/1972 | Economou | 260/29.6 NR |
| 3,724,547 | 4/1973 | Bott | 166/274 |

*Primary Examiner*—Harold D. Anderson
*Attorney, Agent, or Firm*—John G. Premo; John S. Roberts, Jr.

[57] ABSTRACT

Novel compositions are afforded when a stable liquid dispersion of a water-soluble anionic vinyl addition polymer and a water-soluble cationic polymer are dispersed into an aqueous brine.

5 Claims, No Drawings

BRINES CONTAINING WATER-SOLUBLE ANIONIC VINYL ADDITION POLYMER AND WATER SOLUBLE CATIONIC POLYMER

This invention relates to aqueous brines which have uniformly dispersed therethrough from about 0.1 to 50% by weight of a stable liquid dispersion comprising:

A. a polymeric latex composed of a water-in-oil emulsion which contains dispersed therein a finely-divided water-soluble anionic vinyl addition polymer, said polymeric latex having uniformly distributed therethroughout;

B. a water-soluble cationic polymer: with the weight ratio of (A):(B) being within the range of 1:10 tp 10:1 and the total amount of (A)+(B) present within said dispersion being within the range of from 0.001 to 75% by weight.

In the preferred embodiment of the invention the weight ratio of (A):(B) above is within the range of from 1:5 to 5:1 and the amount of (A)+(B) present within said dispersion is within the range of 0.5 to 40%. In a most preferred embodiment of the invention the weight ratio of (A):(B) is within the range of 1:2 to 2:1 and the amount of (A)+(B) within said dispersion is within the range of from 1.0 to 30% by weight.

THE POLYMER LATEX

The polymeric latices or the polymer emulsions are stable and yet contain large amounts of anionic polymer. The anionic polymers dispersed in the emulsion are quite stable when the particle size of the polymer is within the range of 2 millimicrons up to about 5 microns. The preferred particle size is within the range of 5 millimicrons and 3 microns.

The stable water-in-oil emulsion comprises:
A. an aqueous phase;
B. a hydrophobic liquid; and
C. a water-in-oil emulsifying agent.

The polymer containing emulsion of this invention is comprised of an aqueous phase ranging between 70 and 95% by weight of the emulsion. The aqueous phase is defined as the sum of the polymer or copolymer and the water present in the composition. The preferred range is between 75 and 90% by weight of the emulsion. The most preferred range is between 80 and 85% by weight of the emulsion.

The present invention has a polymer concentration between 20 and 50% by weight of the emulsion. a preferred range is between 25 and 40% by weight of the emulsion. The most preferred range is between 30 and 35% by weight of the emulsion.

The anionic polymers most commonly used in the application of this invention are anionic acrylamide polymers which include such as, for instance, acrylic acid, methacrylic acid and maleic anhydride copolymers. The copolymers contain from about 5 to 95% by weight of acrylamide. The molecular weights of the polymers and copolymers generally exceed 500,000.

An anionic copolymer useful in the practice of this invention is hydrolyzed polyacrylamide which has from 1 to 50% of the original carboxamide groups hydrolyzed to carboxyl groups. The molecular weights of hydrolyzed polyacrylamides generally range from 500,000 to 1 million or more.

Other anionic water-soluble vinyl polymers are described in detail in the following U.S. Pat. Nos. 3,418,237; 3,259,570; and 3,171,805.

Specific water-soluble anionic vinyl addition polymers that are used in the practice of this invention may be illustrated by the following list of polymers:

TABLE I

| Number | Name |
|---|---|
| 1 | Polyacrylic acid-sodium salt |
| 2 | Polymethacrylic acid-sodium salt |
| 3 | Maleic anhydride-vinyl acetate copolymer |
| 4 | Polyvinyl methyl ether-maleic anhydride copolymer |
| 5 | Methacrylic acid-acrylamide copolymer |
| 6 | Polyacrylic acid |
| 7 | Isopropenyl acetate-maleic anhydride sodium salt |
| 8 | Itaconic acid-vinyl acetate |
| 9 | Methyl styrene-maleic anhydride sodium salt |
| 10 | Styrene-maleic anhydride |
| 11 | Methylmethacrylate-maleic anhydride sodium salt |
| 12 | Acrylic acid-styrene |
| 13 | Acrylamide-acrylic acid (5% by weight) |
| 14 | Acrylamide-acrylic acid (50% by weight) |
| 15 | Polystyrene sulfonic acid |
| 16 | Acrylamide-acrylic acid (80% by weight) |

The above polymers may vary in molecular weight. They may be as low as 10,000 or as high as 12 million or more. In many instances the molecular weight will be greater than 1 million.

The invention contemplates using as preferred water-soluble anionic vinyl addition polymers the homo- and copolymers of acrylic acid as well as the water-soluble salts thereof.

The molecular weights of the polymers described above may vary over a wide range, e.g., 10,000 to 25 million. The preferred polymer has a molecular weight in excess of 1 million.

The organic or oil phase of the emulsion is comprised of an inert hydrophobic liquid. The hydrophobic liquid comprises between 5 and 30% by weight of the emulsion. The preferred range is between 10 and 25% by weight of the emulsion. The most preferred range is between 10 and 20% by weight of the emulsion.

The oil phase used in preparing these emulsions may be selected from a large group of organic liquids which include liquid hydrocarbons and substituted liquid hydrocarbons. Preferred group of organic liquids are hydrocarbon liquids, most preferably aliphatic liquid hydrocarbons which include blends of aromatic and aliphatic hydrocarbon compounds, which contain from 4 to 8 carbon atoms. Thus, such organic hydrocarbon liquids as benzene, xylene, toluene, mineral oils, kerosenes, naphthas, and in certain instances, petroleums may be used. A particularly useful oil from the standpoint of its physical and chemical properties is the branch-chain isoparaffinic solvent sold by Humble Oil and Refinery Company under the tradename "Isopar M". Typical specifications of this narrow-cut isoparaffinic solvent are set forth below in Table II:

TABLE II

| Specification Properties | Minimum | Maximum | Test Method |
|---|---|---|---|
| Gravity, API at 60/60°F. | 48.0 | 51.0 | ASTM D 287 |
| Color, Saybolt | 30 | — | ASTM D 156 |
| Aniline point, °F. | 185 | — | ASTM D 611 |
| Sulfur, ppm | — | 10 | ASTM D 1266[1] |
| Distillation, °F. | | | ASTM D 86 |
|   IBP | 400 | 410 | |
|   Dry point | — | 495 | |
| Flash point, °F.[2] | 160 | — | ASTM D 93 |

[1] Nephelometric mod.
[2] Pensky-Martens closed cup

Any conventional water-in-oil emulsifying agent can be used such as sorbitan monostearate, sorbitan monooleate, and the so-called low HLB materials which are all documented in the literature and are summarized in the Atlas HLB Surfactant Selector. Although the mentioned emulsifiers are used in producing good water-in-oil emulsions, other surfactants may be used as long as they are capable of producing these emulsions. The water-in-oil emulsifying agent is presented in amounts ranging between 0.1 and 30% by weight of the emulsion. The preferred range is between 1.0 and 15% by weight of the emulsion. The most preferred range is between 12 and 15% by weight of the emulsion.

These water-in-oil emulsions exhibit the unique ability of rapidly dissolving into aqueous solution. The polymer-containing emulsion releases the polymer in water in the presence of a surfactant in a very short period of time. This inversion technique is described in Anderson et al, U.S. Pat. No. 3,264,019. This U.S. patent is incorporated herein by reference.

STABLE LIQUID DISPERSION

The stable liquid dispersion is a water-soluble anionic vinyl addition polymer in the form of a water-in-oil emulsion which contains dispersed therein the finely-divided water-soluble anionic vinyl addition polymer which contains uniformly distributed therethroughout a water-soluble cationic polymer. The water-in-oil emulsion containing dispersed therein the finely-divided water-soluble anionic vinyl addition polymers previously described.

THE WATER-SOLUBLE CATIONIC POLYMERS

These polymers also may be selected from a wide variety of known polymeric materials. Several of these polymers are listed below in Table III:

TABLE III

| Number | Name |
|---|---|
| 1 | Ethylene dichloride-ammonia condensation polymers |
| 2 | Tetraethylene pentamine-eipchlorohydrin condensation polymers |
| 3 | Epichlorohydrin-ammonia condensation polymers |
| 4 | Polyethylene imine |
| 6 | Polydiallyl amine |
| 8 | The methyl chloride quaternary of Number 1 |
| 9 | The benzyl chloride quarternary of Number 7 |
| 10 | Guanidine formaldehyde condensation polymers |

The above polymers are illustrative of typical water-soluble cationic polymeric materials that may be used in the practices of the invention. A preferred class of these polymers may be described as alkylene poly-amines which are illustrated by polymers 1, 2, 3, 4, 5 and 8 above.

Many of the above polymers have been described with respect to the reactants from which they are prepared. A detailed discussion of the above polymers and other cationic polymers appears in Canadian Pat. No. 731,212, the disclosure of which is incorporated herein by reference. The polymers may be employed as solutions or in the form of a water-in-oil latex emulsion. When the polymers are of the vinyl addition type they may be copolymers of other ethylenically saturated monomers. Such copolymers should contain at least 5% by weight of the cationic monomer.

Once the latices containing the water-soluble anionic vinyl addition polymers are prepared as described above, the stable liquid dispersion is prepared by combining the latex containing polymer with the water-soluble cationic polymers by the utilization of conventional mixing techniques. Preferably, the water-soluble cationic polymers are in the form of aqueous solutions which contain 5 to 40% by weight of the polymer and are added to the polymeric latex. Alternatively, they may be nearly water-free. After uniformly mixing the two components there results a dispersion of a water-soluble anionic vinyl addition polymer and a water-soluble cationic polymer. The proportions of the two polymers may be varied to a considerable degree. As indicated, the ratio of the water-soluble anionic vinyl addition polymer to water-soluble cationic polymer may vary between 1:10 to 10:1 on a weight basis. A preferred ratio is 1:5 to 5:1. The most preferred ratio is 1:2 to 2:1.

The amount of water-soluble anionic vinyl addition polymers plus water-soluble cationic polymers present in the finished stable dispersion may be varied over a wide range of concentrations, e.g., liquid dispersions containing from 0.001 to 75% by weight are useful, although for most applications the total weight of the two polymers contained in the dispersion concentrate will be within the range of 5 to 40% by weight, with a very beneficial dispersion being one which contains between 10 to 30% by weight of the two polymers.

The finished dispersion concentrates are stable at room temperature for periods of time ranging between several days to as long as six months since they may be prepared over a wide variety of concentrations. To illustrate the preparation of stable liquid dispersions, a variety of emulsions were prepared containing different water-soluble anionic vinyl addition polymers. These emulsions are set forth below in Table IV.

TABLE IV

| COMPOSITION NUMBER | WATER (% by wt.) | OIL (% by wt.) | POLYMER | % In EMULSION | POLYMER PARTICLE Size Range |
|---|---|---|---|---|---|
| I | 72 | 28(I) | 93% acrylamide 7% methacrylic acid | 35% | 0.05–7.0 microns |
| II | 72 | 28(I) | 93% acrylamide 7% methacrylic acid | 35% | 0.05–7.0 microns |
| III | 72 | 28(T) | 70% acrylamide 30% acrylic acid | 35% | 0.05–7.0 microns |
| IV | 67 | 33(I) | 93% acrylamide 7% methacrylic acid | 32% | <30 microns |
|  |  |  | 70% crylamide |  |  |
| V | 70 | 30(I) | 70% acrylamide 30% acrylic acid | 34% | .01–10 microns |
| VI | 71 | 29(I) | Sodium Polyacrylate | 37% | <1 mm. |

(I) = Isopar M    (T) = Toluene

DISPERSION A

To the emulsion in Table IV, Composition Number VI, there was added 30% by weight of an aqueous dispersion containing 23% by weight of an alkylene polyamine prepared from the condensation of ethylene dichloride and ammonia. The polymer was prepared using the techniques set forth in Canadian Pat. No. 785,829.

DISPERSION CONCENTRATE B

To Composition Number VI in Table IV, there was added an aqueous dispersion which contained 25% by weight of an ammonia ethylene dichloride polymer of the type used in DISPERSION A above, with the exception it had been quaternized with methyl chloride.

To illustrate other novel dispersion concentrates of the invention Table V is presented below:

TABLE V

| DISPERSION | ANIONIC LATEX TABLE IV | % BY WEIGHT | CATIONIC POLYMER | % BY WEIGHT |
|---|---|---|---|---|
| C | I | 60 | 20% solution of a tetraethylene pentamine epichlorohydrin reaction product (Canadian pat. 731,212) | 40 |
| E | V | 70 | 75% acrylamide, 25% dimethylamino ethyl methacrylate copolymer in the form of a latex (water-in-oil) - See Table II, U.S. 3,624,019 | |

All of the above dispersion concentrates were stable and were capable of being stored under a variety of conditions without interraction of the two polymers.

Surprisingly it has been found that the stable liquid dispersions of the water-soluble anionic vinyl addition polymers and water-soluble cationic polymers may be added to aqueous brines to provide stable systems of brine and the above dispersion which brines contain from .1 to 50% by weight of the said polymeric dispersion. In a preferred embodiment the brines contain from 1.0 to 20% by weight of the polymer dispersions. These brine dispersions allow the polymers to be diluted in the brine yet, at the same time, they remain stable for periods of time ranging from several hours to as long as several weeks depending upon the concentration of the dispersion in the brine and the concentration of the brine itself.

The starting aqueous brines into which the dispersions are added include water which contains at least 1,000 ppm of dissolved inorganic salts such as sodium chloride. Brines more concentrated that this, e.g. seawater, may be employed in the invention and in fact any aqueous salt solution containing any inorganic salt or salts up to their saturation solubility in the water may be used.

The advantages of the composition of the invention resides in the fact that they may be readily insolubilized by adding them to water other than a brine and at a concentration considerably higher than for solution polymers of the same molecular weight. The above compositions therefore find use in waterflooding applications, in the secondary recovery of petroleum, in water shut-off applications, and in secondary recovery operations. For further description of such usage, see the disclosure of U.S. Pat. Nos. 3,721,295 and 3,724,547. One of the primary uses of these compositions resides in their use to prevent seepage control which occurs in irrigation ditches, feeder canals and the like, These brines are disclosed in Ser. No. 295,633 Latex Polymer Formulations for Seepage Control, filed Oct. 6, 1972 now U.S. Pat. No. 3,832,299.

In the present specification and claims, the terms "polyacrylic acid" and "polyacrylic acid and salts thereof" refer to the polymerized free acid and soluble salts thereof, such as alkali metal and ammonium salts, e.g. sodium, potassium and ammonium. Also, the terms "acrylamide polymers" and "acrylic acid polymers" include homopolymers and copolymers of acrylamide and acrylic acid, respectively.

EXAMPLE

When 20% by weight of Dispersion Concentrate B is added to seawater, this system is stable for 6 hours.

I claim:

1. An aqueous brine consisting essentially of from 0.1 to 50% by weight of a stable liquid dispersion of:
   A. a polymeric latex composed of a water-in-oil emulsion which contains dispersed therein a finely divided water-soluble anionic vinyl addition polymer, said polymer being selected from at least one member of the group consisting of acrylamide polymers and acrylic acid polymers, and said polymeric latex having uniformly distributed therein throughout;
   B. a water-soluble cationic polymer selected from at least one member of the group consisting of alkylene polyamine/epichlorohydrin and ethylene dichloride/ammonia polymers with the weight ratio of (A):(B) being within the range of 1:10 to 10:1 and the total amount of (A)+(B) present within said dispersion being within the range of from 0.001 to 75% by weight, said dispersion being uniformly dispersed therethroughout said brine.

2. The aqueous brine of claim 1 wherein the stable liquid dispersion has a weight ratio of (A):(B) within the range of from 1:5 to 5:1 and the amount of (A)+(B) present within said dispersion is within the range of from 5 to 40% by weight.

3. The aqueous brine of claim 1 wherein the stable liquid dispersion wherein the weight ratio of (A):(B) is within the range of from 1:2 to 2:1 and the amount of (A)+(B) within said dispersion is within the range of from 10 to 30% by weight.

4. The aqueous brine of claim 1 wherein the stable liquid dispersion is:
  A. a polymeric latex composed of a water-in-oil emulsion which contains dispersed therein a finely-divided polyacrylic acid or a water-soluble salt thereof, said polymeric latex having uniformly distributed therein throughout;
  B. a water-soluble alkylene polyamine/epichlorohydrin polymer: with the weight ratio of (A):(B) being within the range of 1:10 to 10:1 and the total amount of (A)+(B) present within said dispersion being within the range of from 0.001 to 75% by weight.

5. The aqueous brine of claim 1 wherein the water-soluble anionic polymer is polyacrylic acid or its water-soluble salts and the water-soluble cationic polymer is an alkylene polyamine/epichlorohydrin polymer.

* * * * *